(12) United States Patent
Kumagai et al.

(10) Patent No.: US 7,019,804 B2
(45) Date of Patent: Mar. 28, 2006

(54) LIQUID CRYSTAL CELL WITH TWIST ANGLE FROM 180 TO 270 DEGREES AND TWISTED OPTICAL COMPENSATING ELEMENT

(75) Inventors: Yoshihiro Kumagai, Yokohama (JP); Akira Masaki, Yokohama (JP); Tetsuya Uesaka, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 133 days.

(21) Appl. No.: 10/490,709

(22) PCT Filed: Sep. 6, 2002

(86) PCT No.: PCT/JP02/09120

§ 371 (c)(1),
(2), (4) Date: Mar. 25, 2004

(87) PCT Pub. No.: WO03/029886

PCT Pub. Date: Apr. 10, 2003

(65) Prior Publication Data

US 2004/0246418 A1    Dec. 9, 2004

(30) Foreign Application Priority Data

Sep. 28, 2001   (JP) ............................ 2001-300757

(51) Int. Cl.
G02F 1/1335       (2006.01)

(52) U.S. Cl. ............................ 349/117; 349/75; 349/76

(58) Field of Classification Search ............ None
See application file for complete search history.

(56) References Cited

U.S. PATENT DOCUMENTS

| 5,250,214 A | 10/1993 | Kanemoto et al. ..... 252/299.01 |
| 5,737,046 A | 4/1998 | Moriwaki et al. .......... 349/117 |
| 6,373,542 B1 * | 4/2002 | Yamahara et al. .......... 349/118 |

FOREIGN PATENT DOCUMENTS

| EP | 0380338 | 8/1990 |
| JP | 3087720 | 4/1991 |
| JP | 3291620 | 12/1991 |
| JP | 3291623 | 12/1991 |
| JP | 3294821 | 12/1991 |
| JP | 4003020 | 1/1992 |
| JP | 4016917 | 1/1992 |
| JP | 01228328 | 8/2001 |

\* cited by examiner

Primary Examiner—Andrew Schechter
Assistant Examiner—Michael H. Caley
(74) Attorney, Agent, or Firm—Adams & Wilks

(57) ABSTRACT

A liquid crystal display device has a liquid crystal cell, a liquid crystalline substance layer, a pair of polarizers, and an optical compensation element. The twist angle of the liquid crystal cell is set to 180 to 270 degrees. The optical compensation element has a twisted structure twisted in the opposite direction to that of the liquid crystal cell. The difference in the absolute values of the twist angles between the liquid crystal cell and the optical compensation element is from 40 to 100 degrees. The difference in retardation at a wavelength $\lambda=550$ nm between the liquid crystal cell and the optical compensation element is from 100 to 250 nm. When the absolute values of the differences in retardation at wavelengths $\lambda$ of 400 nm and 550 nm between the liquid crystal cell and the optical compensation element are represented by $\Delta R(400)$ and $\Delta R(550)$, respectively, and the ratio D therebetween is represented by $D=\Delta R(400)/\Delta R(550)$, D is within the range of 0.5 to 1.0.

2 Claims, 7 Drawing Sheets

LIQUID CRYSTAL CELL WITH TWIST ANGLE FROM 180 TO 270 DEGREES AND TWISTED OPTICAL COMPENSATING ELEMENT

BACKGROUND OF THE INVENTION

1. Field of the Invention

This invention relates to liquid crystal display device capable of displaying in a transmissive, reflection or transflection mode.

2. Background Information

Liquid crystal display (hereinafter referred to as "LCD") devices which have been currently used are those of a TFT (Thin Film Transistor) or TFD (Thin Film Diode) type which perform display in various display modes such as TN (Twisted Nematic) VA (Vertical Alignment), and IPS (In-Plane Switching) modes in an active-matrix mode using TFT or TFD elements and those of an STN (Super Twisted Nematic) type which perform display in an STN liquid crystal display mode in a passive-matrix mode.

The LCD devices of the TFT and TFD types are characterized by excellent picture quality and response speed and have been widely used in lap top computers, liquid crystal monitor, or liquid crystal television receivers. Although the STN type LCD devices are a little poor in picture quality and response speed, compared with those of the TFT type, they can be produced at a low cost due to their simple structures and low electricity consumption and can be used widely as displays for cellular phones, personal digital assistants, mobile personal computers, and mobile television receivers.

The above-described STN type liquid crystal display devices are generally structured so that a liquid crystal cell is sandwiched between a pair of polarizers and further provided with a reflector on the outside of either one of the polarizers when used in a reflection type liquid crystal display device.

The STN type liquid crystal display (may be referred to as "STN-LCD" hereinafter) device can not avoid an undesired coloration of displayed colors because optical rotating properties and birefringence are utilized on their displaying principle. In order to perform black and white display and further color display with overcoming the above-mentioned coloration, a method using an optical element for compensation has come into wide use. At the early stage, a method so-called double layer liquid crystal mode (D-STN: Double-layer STN) had been used wherein a compensation liquid crystal cell having a retardation (product of birefringence Δn and layer thickness d) substantially equivalent to that of a driving liquid crystal cell and having a twisted structure whose twist angle is the same as and twist direction is opposite to those of the driving cell is arranged for compensation such that the adjacent orientation axes of the driving- and compensation-liquid crystal cells form a right angle (Television Gakkai Technical Report by Osamu Okumura, 11, 79 (1987); Jpn. J. Appl. Phys., by K. Katou, 26, L17, 784 (1987); SID Digest by Y. Nagase, 1989).

However, although this method can achieve a high contrast display, it had been used for a short period of time because it had disadvantages that it increased the cost and the weight and thickness of the LCD device due to the use of two liquid crystal cells. Currently, a method has been used wherein pseudocompensation is performed with an optical retardation film obtained by precision-stretching a polymeric film such as polycarbonate. However, while the method using such an optical retardation film is simple and inexpensive, it has a problem that the undesired colored display of an STN-LCD device can not be substantially avoided due to the absence of a twisted molecular orientation in the optical retardation film.

As a third compensation method, there have been proposed methods using a liquid crystal film with a fixed twisted nematic liquid crystal orientation as an optical compensation film, as disclosed in Japanese Laid-Open Patent Publication Nos. 3-87720, 3-291620, 3-291623, 3-294821, and 4-003020. This optical compensation film has a twisted structure between molecules and thus is an excellent film having both an excellent compensation effect achieved by the method using a compensation liquid crystal cell and advantages of the method using an optical retardation film, i.e., easiness in use and low cost.

This compensation method is similar in principle to the D-STN method and optically compensates in the non-selective voltage application period. Therefore, since the polarization state of a light passing through the incident-side polarizer, the optical compensation film, and the driving liquid crystal cell becomes linearly polarized in all the wavelengths in the non-selective voltage application period, substantially perfect black display and substantially perfect white display can be obtained in the normally black mode (black in the non-selective voltage period) and in the normally white mode (white in the non-selective voltage period), respectively by properly selecting the position of the absorption axis of a polarizer of the output side.

On the other hand, in the selective voltage application period, the polarization state of a light passing through the incident-side polarizer, the optical compensation film, and the driving liquid crystal cell becomes elliptically polarized, unlike in the non-selective voltage application period. Furthermore, the elliptically polarized light varies in ellipticity and azimuth angle depending on wavelength. Therefore, since the selective voltage application period fails to provide perfect white or black display in the normally black mode or the normally white mode, unlike in the non-selective voltage application period, the development of more proper optical means has been required.

The object of the present invention is to provide a liquid crystal display device which is capable of providing a high-contrast white display with excellent brightness and hue in the normally black mode and a bright white-paper display and excellent black display in the normally white mode.

SUMMARY OF THE INVENTION

According to a first aspect of the present invention, there is provided a liquid crystal display device comprising a liquid crystal cell formed by a pair of transparent substrates each provided with an electrode and a liquid crystalline substance layer sandwiched between the substrates, polarizers disposed on both sides of the liquid crystal cell, and an optical compensation element disposed on at least one side of the liquid crystal cell between the liquid crystal cell and the polarizers, a driving voltage being applied on the liquid crystalline substance layer by selecting the voltage from two or more voltages, wherein the twist angle of the liquid crystal cell is set to 180 to 270 degrees; the optical compensating element has a twisted structure twisted in the opposite direction to that of the liquid crystal cell; the difference in the absolute values of the twist angles between the liquid crystal cell and the optical compensation element is from 40 to 100 degrees; the difference in retardation at a wavelength λ=550 nm between the liquid crystal cell and the optical compensation element is from 100 to 250 nm; and when the absolute values of the differences in retardation at wavelengths λ of 400 nm and 550 nm between the liquid crystal cell and the optical compensation element are represented by $\Delta R(400)$ and $\Delta R(550)$, respectively and the ratio D therebetween is represented by $D=\Delta R(400)/\Delta R(550)$, D is within the range of 0.5 to 1.0.

According to a second aspect of the present invention, there is provided the liquid crystal display device of the first aspect wherein the optical compensation element is a liquid crystal film.

DETAILED DESCRIPTION OF THE PREFERRED EMBODIMENTS

Figure 1:
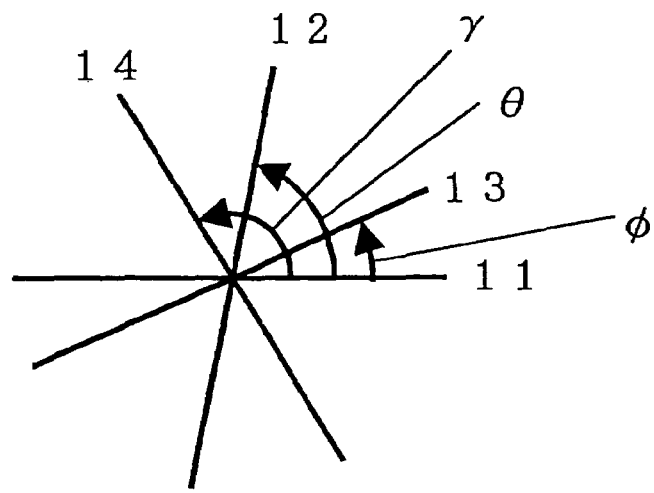
FIG. 1 shows the relation of a polarizer and an optical anisotropic body in terms of axis orientation for describing the concept of the present invention.

The present invention will be described in more details below.

The liquid crystal display device of the present invention comprises a liquid crystal cell, polarizers disposed on both sides thereof, and an optical compensation element disposed on at least one side of the liquid crystal cell between the liquid crystal cell and the polarizers.

The liquid crystal cell has a liquid crystalline substance layer sandwiched between a pair of transparent substrates each provided with an electrode. Transparent substrates which can be used in the present invention are those capable of aligning a liquid crystalline substance. More specific examples are those which themselves have a capability of aligning a liquid crystalline substance and those provided with an alignment layer capable of aligning a liquid crystalline substance. A pair of such transparent substrates with alignability are retained such that their aligning directions are twisted, between which substrates a layer of a liquid crystalline substance (liquid crystalline substance layer) is formed, thereby forming the liquid crystalline substance layer in a specific twist angle. Electrode is generally provided on the surface of a transparent substrate on which surface the liquid crystalline substance layer contacts. In the case of using a transparent substrate with an alignment layer, an electrode is provided between the alignment layer and the transparent substrate. Liquid crystalline substances which can be used in the present invention are various substances which have been used in an STN-LCD.

In the liquid crystal display device of the present invention, a driving voltage is applied on the liquid crystalline substance layer by selecting the voltage from two or more voltages. No particular limitation is imposed on the two or more voltages as long as they are practical voltages to perform liquid crystal displaying. Therefore, the two or more voltage values may be those at which prior to and after rapid changes in reflectivity and transmissivity occur. As a result, the liquid crystalline substance layer functions as an active optical layer providing display in a white state (bright state) and a black state (dark state).

The retardation of the liquid crystal cell at a wavelength λ of 550 nm is desirously within the range of 600 nm or higher and 1,100 nm or lower. A liquid crystal cell of the retardation of lower than 600 nm would be small in the state change of liquid crystal when voltage is applied. A liquid crystal cell of the retardation of higher than 1,100 nm would be poor in response.

The polarizers constituting the liquid crystal display device of the present invention are disposed on both sides of the liquid crystal cell. No particular limitation is imposed on the polarizers which, therefore, may be those which have been generally used in a liquid crystal display. Specific examples are PVA (polyvinyl alcohol)-based polarizing films such as PVA and partial acetal PVA; polarizing films such as those obtained by stretching a hydrophilic polymeric film comprising a partially saponified product of an ehtylene-vinyl acetate copolymer to which iodine and/or a dichroic dye are absorbed; and those comprising a polyene-oriented film such as a dehydrated product of PVA and a dehydrochlorinated product of polyvinyl chloride.

The polarizer may be used alone or may be provided on one or both surfaces with a transparent protective layer for the purpose of enhancing the strength, moisture-resistance, and heat resistance. Transparent protective layers may be those formed by laminating a transparent plastic film such as polyester and triacetyl cellulose directly or via a tacky adhesive or adhesive layer; coated layers of resin; and acrylic- or epoxy-based photo-curing type resin layers. When the protective layers are coated on both surfaces of the polarizing film, they may be the same or different.

In the present invention, an optical compensation element is disposed on at least one side between the liquid crystal cell and the polarizers. The optical compensation element has a twisted structure. That is, the optical compensation element has a structure wherein the orientation directions of the molecules are twisted from one surface to the other surface, similarly to a liquid crystal cell of a TN mode or an STN mode. Although a liquid crystal cell or a liquid crystal film for compensation may be used as the optical compensation element, the element may be a film having a pseudo twisted structure obtained by laminating a large number of uniaxially stretched optical retardation films with shifting the angle of the stretch axis of each retardation film little by little.

An optical compensation element having a twisted structure and optimized in optical parameters is used in the liquid crystal display device of the present invention. In the case of driving a transmissive STN-LCD device in the normally black mode using a conventional D-STN method, the twisted-structured optical compensation element used therein had such parameters that it had a twist angle which was the same as the absolute value of the twist angle of the liquid crystal cell but a twisted direction which was opposite to that of the liquid crystal cell and a retardation which was equivalent to or slightly smaller than that of the liquid crystal cell.

Whereas, the optical compensation element used in the present invention has such a twisted structure that the twisted direction is opposite to that of the liquid crystal cell; the difference in the absolute value of the twist angle between the liquid crystal cell and the optical compensation element is from 40 to 100 degrees and preferably 45 to 75 degrees; and the difference in retardation at a wavelength λ of 550 nm between the liquid crystal cell and the optical compensation element is from 100 to 250 nm and preferably 120 to 200 nm. If the difference in retardation at wavelengths of 550 nm between the liquid crystal cell and the optical compensation element deviates from these ranges, the resulting display device could provide display at a certain level but would be extremely decreased in contrast ratio, compared with the conventional ones.

The reasons for adopting the above-mentioned parameters will be described briefly.

In the case where the twist direction of an optical compensation element is opposite to that of a liquid crystal cell and their helical pitches are substantially equal, the liquid crystal cell and the optical compensation element arranged and overlapped such that their adjacent orientation axes are crossed substantially at right angles can be regarded as a single twisted optical anisotropic body. The twist angle and retardation of the optical anisotropic body can be approximated to the differences in twist angle and retardation between the liquid crystal cell and the optical compensation element. This is the same idea that when two uniaxial optical retardation films with a different retardation are arranged such that their adjacent orientation axes are crossed at right angles, the whole laminated retardation films can be regarded as a single optical anisotropic body and the retardation thereof can be regarded as the difference in retardation between the two uniaxial retardation films. Therefore, this single laminated optical anisotropic body is used for seeking the optimum compensation conditions.

Now, in the case of arranging polarizers on both sides of one sheet of twisted optical anisotropic body, the transmittance "T" can be derived from a 2×2 matrix method known as the Jones vector as shown in equation (1) (E. P. Raynes, Mol. Cryst. Liq. Cryst. Lett., Vol. 4, 69 (1987), A. Lien, IEEE Trans. Electron Devices, Vol. 36, No. 9, 1910 (1989)):

$$T = \frac{1}{2}\left\{\cos\beta\cos(\theta - \gamma + \phi) + \frac{\theta}{\beta}\sin\beta\sin(\theta - \gamma + \phi)\right\}^2 + \frac{1}{2}\left\{\frac{\theta\alpha}{\beta}\sin\beta\cos(\theta - \gamma - \phi)\right\}^2 \quad (1)$$

The relation of axes of the polarizer and the optical anisotropic body is as shown in FIG. 1. That is, the numeral 11 indicates the orientation axis on the side, adjoining the incident-side polarizer, of the optical anisotropic body, the numeral 12 indicates the orientation axis on the side, adjoining the output-side polarizer, of the optical anisotropic body, the numeral 13 indicates the absorption axis of the incident-side polarizer, the numeral 14 indicates the absorption axis of the output-side polarizer, θ indicates the twist angle of the optical anisotropic body, φ indicates the angle formed by the orientation axis 11 and the absorption axis 13, and γ indicates the angle formed by the orientation axis 11 and the absorption axis 14. Furthermore, when λ and [Δnd] indicate wavelength and the retardation of the optical anisotropic body, respectively, α and β are represented by the following equations:

$$\alpha = \frac{[\Delta nd] \times \pi}{\theta \times \lambda}, \beta = \theta\sqrt{1 + \alpha^2}$$

Now, assuming that the absolute value of the angle φ formed by the orientation axis 11 and the absorption axis 13 and the absolute value of the angle γ formed by the orientation axis 11 and the absorption axis 14 are 45 degrees, respectively, they are represented by the following equations:

$$\phi = \pi/4 \quad (2)$$

$$\gamma = \phi + \theta + \pi/2 \quad (3)$$

or $$\phi = \pi/4 \quad (4)$$

$$\gamma = \phi + \theta \quad (5)$$

Therefore, when these equations are substituted in equation (1), equations (6) and (7) are obtained:

$$T = \frac{1}{2}\sin^2\beta = \frac{1}{2}\left\{\sin\theta\sqrt{1 + \left(\frac{[\Delta nd] \times \pi}{\lambda \times \theta}\right)^2}\right\}^2 \quad (6)$$

$$T = \frac{1}{2}\cos^2\beta = \frac{1}{2}\left\{\cos\theta\sqrt{1 + \left(\frac{[\Delta nd] \times \pi}{\lambda \times \theta}\right)^2}\right\}^2 \quad (7)$$

wherein when equation (1) is converted to equations (8) or (9), T=0

$$\beta = m\pi \quad (m \text{ is an integer}) \quad (8)$$

$$= \sqrt{\theta^2 + \left(\frac{[\Delta nd] \times \pi}{\lambda}\right)^2}$$

$$\beta = \left(m + \frac{1}{2}\right)\pi \quad (m \text{ is an integer}) \quad (9)$$

$$= \sqrt{\theta^2 + \left(\frac{[\Delta nd] \times \pi}{\lambda}\right)^2}.$$

Whereby, equation (10) or (11) are obtained:

$$[\Delta nd] = \lambda\sqrt{m^2 - \left(\frac{\theta}{\pi}\right)^2} \quad (10)$$

$$[\Delta nd] = \lambda\sqrt{\left(m + \frac{1}{2}\right)^2 - \left(\frac{\theta}{\pi}\right)^2}. \quad (11)$$

Figure 2:
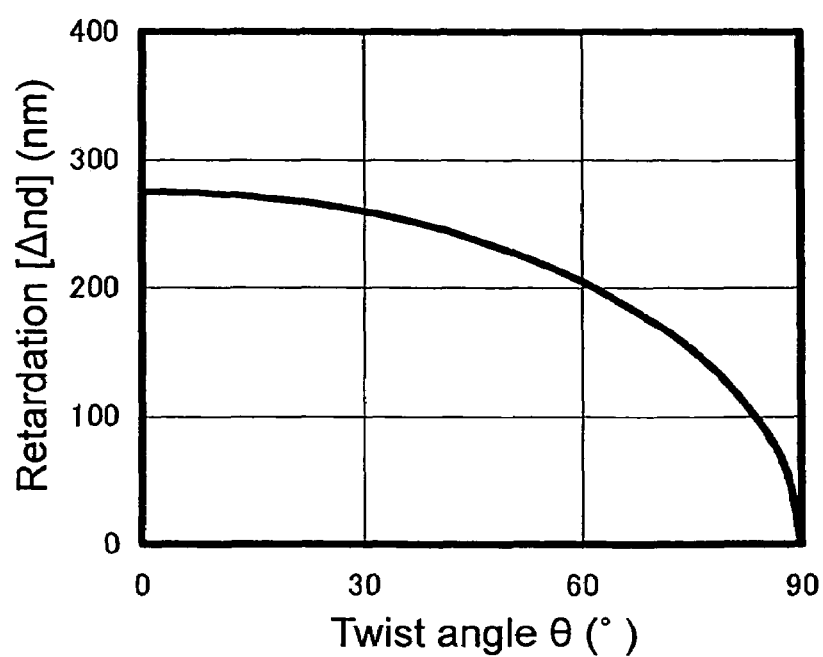
FIG. 2 is a graph showing the relation of the retardation [$\Delta$nd] and the twist angle θ in equation (11) wherein λ=550 nm, m=0.

More specifically, from these equations, the relational equation between retardation [Δnd] and twist angle θ wherein T=0 at a specific wavelength λ can be obtained. In formula (11) wherein m=0, the relation between [Δnd] and twist angle θ at a wavelength λ of 550 nm at which the highest spectral luminous efficacy is obtained is illustrated as shown in FIG. 2. From these results, when the difference in twist angle θ and [Δnd] of an optical anisotropic body fulfills the relation shown in FIG. 2, a light just before passing the output-side polarizer becomes a linearly polarized in the non-selective voltage application period thereby accomplishing a perfect compensation.

As a result of examining the optimum compensation conditions including the selective voltage application period using an actual liquid crystal cell and an actual optical compensation element in view of the foregoing results, it was found that an excellent compensation state can be accomplished when the optical compensation element has a twisted structure twisted in the opposite direction to that of the liquid crystal cell, the difference in the absolute value of the twist angle between the liquid crystal cell and the optical compensation element is from 40 to 100 degrees, and the difference in retardation at a wavelength λ=550 nm between the liquid crystal cell and the optical compensation element is from 100 to 250 nm.

When the relation shown in FIG. 2 is fulfilled, equation (7) is converted to equation (12):

$$T = \frac{1}{2}\cos^2\beta = \frac{1}{2}\left\{\cos\theta\sqrt{1 + \left(\frac{[\Delta nd] \times \pi}{\lambda \times \theta}\right)^2}\right\}^2 = 0. \quad (12)$$

It follows from equation (12) that T=0 at all the wavelength when the ratio of [Δnd] to wavelength λ is constant. That is, this indicates ideal when the difference in retardation between a liquid crystal cell and an optical compensation element is in a proportional relation to wavelength λ. In practical sense it is difficult to obtain such an ideal state due to the restriction of liquid crystalline materials used for a liquid crystal cell and an optical compensation element. However, as a result of conducting a study in consideration of the above-obtained findings and even up to the birefringence wavelength dispersion, it was found that when the absolute values of the differences in retardation between a liquid crystal cell and an optical compensation element at wavelengths λ of 400 nm and 550 nm are represented by ΔR(400) and ΔR(550), respectively and the ratio D therebetween is represented by D=ΔR(400)/ΔR(550), D is within the range of 0.5 to 1.0 and preferably 0.7 to 0.9; a compensation state which is equivalent to that of the D-STN could be accomplished in the non-selective voltage application period, resulting in an excellent black display in the normally black mode and an excellent white display close to paper white in the normally white mode. Furthermore, it was also confirmed that a compensation state superior to that of the D-STN could be achieved in the selective voltage application period. The value of D less than 0.5 or exceeding 1.0 would cause an insufficient compensation state in the non-selective voltage application period.

In the liquid crystal display device of the present invention, the optical parameters (twist angle, retardation, and D value) of the liquid crystal cell and optical compensation elements are set to be in the relation described above. Furthermore, in the liquid crystal display device of the present invention, less coloration and excellent contrast can be obtained by adjusting the absolute value $|\theta_A|$ of the angle $\theta_A$ measured from the absorption axis of the display-side polarizer to the orientation axis on the side, facing the display-side polarizer, of the optical compensation element; the absolute value $|\theta_B|$ of the angle $\theta_B$ measured from the orientation axis on the side, facing the liquid crystal cell, of the optical compensation element to the orientation axis on the side, facing the optical compensation element, of the liquid crystal cell; and the absolute value $|\theta_C|$ of the angle $\theta_C$ measured from the orientation axis on the side, facing the polarizer opposite to the display-side, of the liquid crystal cell to the absorption axis of the polarizer disposed on the side opposite to the display side as follows:

$35° \leq |\theta_A| \leq 55°$ $80° \leq |\theta_B| \leq 90°$ $35° \leq |\theta_C| \leq 55°$ Although the angles $\theta_A$, $\theta_B$, and $\theta_C$ can be expressed either in clockwise or counterclockwise, they are expressed in the direction where the absolute values are 0 degree or larger and 90 degrees or smaller and affixed with a sign (+) or (−) so as to identify their relative directions.

The liquid crystal film mentioned above is a film having such a structure that the orientation direction of the molecules in a single film is continuously twisted in the thickness direction thereof. In general, this film can be obtained by forming a liquid crystal material having twisted-aligning properties into a film. More specifically, the liquid crystal film can be obtained by aligning a composition prepared by blending a liquid crystalline material exhibiting a nematic liquid crystallinity with a chiral dopant or a liquid crystalline material exhibiting a twisted nematic liquid crystallinity in a twisted nematic orientation and then by photo- or thermal crosslinking the composition or the material to fix the aligned structure or by cooling the same to be in a glass state so as to fix the aligned structure.

No particular limitation is imposed on the liquid crystalline material as long as it exhibits a nematic or twisted nematic liquid crystallinity. Therefore, various low molecular weight liquid crystalline substances, various polymeric liquid crystalline substances, and mixtures thereof can be used in the present invention. Regardless of whether the molecular shape of the liquid crystalline material is like bar or disc, liquid crystalline materials exhibiting a discotic nematic liquid crystallinity can be also used in the present invention. In the case of using a mixture of these materials, no particular limitation is imposed on the composition and ratio of the materials as long as the desired twisted nematic aligned structure can be formed with these materials and can be fixed. For example, there may be used a mixture of one or a plurality of types of low molecular weight- and/or polymeric-liquid crystalline substances and a mixture of one or a plurality of types of low molecular weight- and/or polymeric-non-liquid crystalline substances or various additives.

Examples of the low molecular weight liquid crystalline substance which can be used in the present invention are those having a Schiff base-, biphenyl-, terphenyl-, ester-, thioester-, stillbene-, tolan-, azoxy-, azo-, phenyl cyclohexane-, pyrimidine-, cyclohexylcyclohexane-, trimesic acid-, triphenylene-, truxene-, phthalocyanine-, or porphrin-based molecular structure and mixtures thereof.

Examples of the polymeric liquid crystalline substances which can be used in the present invention are various main chain type- and side chain type-polymeric liquid crystalline substances and mixtures thereof. Examples of the main chain-type polymeric liquid crystalline substance are polyester-, polyamide-, polycarbonate-, polyimide-, polyurethane-, polybenzimidazole-, polybenzoxazole-, polybenzthiazole-, polyazomethine-, polyesteramide-, polyestercarbonate-, and polyesterimide-based polymeric liquid crystalline substances, and mixtures thereof. Among these, particularly preferred are semi-aromatic polyester-based liquid crystalline polymers wherein mesogens providing liquid crystallinity and flexible chains, such as polymethylene, polyethyleneoxide, and polysiloxane are alternately bonded and wholly aromatic polyester-based liquid crystalline polymerss which are free of flexible chain because they are easily synthesized and fixed and excellent in alignability.

Examples of the side chain-type polymeric liquid crystalline substances are those having a straight or cyclic main chain, such as polyacrylate-, polymethacrylate-, polyvinyl-, polysiloxane-, polyether-, polymalonate-, and polyester-based substances, to which mesogen groups are bonded as side chains and mixtures thereof. Among these, particularly preferred are those wherein a mesogen providing liquid crystallinity is bonded to the main-chain via a spacer comprised of a flexible chain and those having a molecular structure wherein both the main chain and the side chain have mesogens.

The liquid crystalline material is preferably blended with a chiral dopant or various liquid crystalline materials or non-liquid crystalline materials having at least one chiral structural unit for inducing a twisted nematic orientation.

The chiral structural unit may be those derived from optically active 2-methyl-1,4-butanediol, 2,4-pentanediol, 1,2-propanediol, 2-chloro-1,4-butanediol, 2-fluoro-1,4-butanediol, 2-bromo-1,4-butanediol, 2-ethyl-1,4-butanediol, 2-propyl-1,4-butanediol, 3-methylhexanediol, 3-methyl adipic acid, naproxen derivatives, camphoric acid, binaphthol, menthol, or a compound having a cholesteryl group-containing structural unit or derivatives thereof such as derivatives of diacetoxy compounds. The chiral structural unit may be R-form or S-form or a mixture thereof. These structural units are merely examples and thus the present invention is not limited thereto.

In the case of fixing the aligned structure formed in a liquid crystalline state by photo- or thermal-crosslinking during preparation of the liquid crystal film, a liquid crystalline material is desirously blended with various liquid crystalline substances having functional groups or sites which are reactive to a crosslinking reaction with heat or light. Examples of such functional groups are such as acryl, methacryl, vinyl, vinyl ether, allyl, allyloxy, and epoxy groups such as glycidyl; oxetane; isocyanate; isothiocyanate; azo; diazo; azido; hydroxyl; carboxyl; and lower ester groups. Particularly preferred are acryl, methacryl, epoxy, oxetane groups. Examples of the crosslinkable site are those containing a molecular structure of maleimide, maleic anhydride, cinnamic acid, cinnamate, alkene, diene, allene, alkyne, azo, azoxy, disulfide, or polysulfide. Although these crosslinkable groups or sites may be contained in various liquid crystalline substances constituting the liquid crystal material, a non-liquid crystalline substance containing the crosslinkable groups or sites may be separately added to the liquid crystalline material to an extent that the exhibition of the liquid crystallinity is not hindered.

The liquid crystal film may have a temperature-compensation effect due to which the retardation varies with temperature. The use of such a temperature-compensation element makes it possible to produce an excellent liquid crystal display device whose the color of display hardly changes even though the surrounding temperature varies. In such a case, it is desirous that the degree of change in retardation of the optical compensation element with temperature is substantially equal to that of the liquid crystalline substance layer to be used in a liquid crystal cell.

Alternatively, the liquid crystal film may be provided with a transparent protective layer as used for the polarizer. The transparent protective layer may be those formed by laminating a transparent plastic film such as polyester, triacetyl cellulose, or an acrylic resin directly or via a tacky adhesive or an adhesive layer; coated layers of resin; and photo- and/or thermal-curing type resin layers of acrylic-, epoxy-, or oxetane-based polymerizable compounds or hydrolyzed products of alkoxide derivatives such as silicon, aluminum, and titanium. When the protective layers are coated on both surfaces of the liquid crystal film, they may be the same or different. The transparent protective layer may be provided by a method wherein a solution of any of the foregoing compounds to an extent that the liquid crystal film is not adversely affected is coated in a conventional manner, and then dried and cured or a transferring method as disclosed in Japanese Patent Laid-Open Publication Nos. 4-57017 and 5-333313. The transparent protective layer has preferably self-supporting properties. However, as long as the transparent protective layer can be incorporated into the liquid crystal display device of the present invention, such self-supporting properties are not always required. Therefore, a transparent protective layer in the form of a thin film can be used for reducing the whole thickness of the liquid crystal display device.

The liquid crystal display device of the present invention is preferably provided with a reflection function when intended to be used in a reflection mode. Such a reflection function can be provided by replacing the polarizer disposed on the side opposite to the displaying side of the liquid crystal cell, with a reflective or transflective polarizer having a reflective or transflective plate. The reflective or transflective plate may be a directional reflective-type which is enhanced in a reflection strength in a specific direction or a non-directional reflective type having no directivity in reflection properties.

Although the polarizers used in the present invention are absorbing-type polarizers using the absorbing properties of iodine or dyes, the polarizer disposed on the side opposite to the display-side may be a reflection-type polarizer having both polarization and reflection functions. Such a reflection-type polarizer may be those provided with anisotropic scattering properties by laminating two types of films alternately and stretching the laminate and those obtained by combining a cholesteric liquid crystalline film exhibiting selective reflection properties and a ¼ wavelength plate. Alternatively, there may be used a combination of a reflection-type polarizer and an absorbing-type polarizer. Further alternatively, the reflection plate may be those using hologram.

The liquid crystal display device of the present invention contains a liquid crystal cell, polarizers, and at least one optical compensation element and is provided with a reflection function if necessary. In addition to the above-described components, the liquid crystal display device of the present invention may be provided with another additional components. For example, the use of a color filter makes it possible to produce a color liquid crystal display device which can provide multi- or full-colored displays with increased color purity. If necessary, the liquid crystal display device may be provided with another additional components such as a back light, a front light, a photo-diffusing layer, a light-controlled film, a light guide plate, a prism sheet, an anti-reflection layer, an anti-glare treated layer, an adhesive layer, a tacky adhesive layer, and a hard coat layer.

APPLICABILITY IN THE INDUSTRY

The liquid crystal display device of the present invention provides bright white display with excellent hue in the normally white mode and bright white display with high contrast in the normally black mode and can achieve display quality which is significantly enhanced, compared with the conventional liquid crystal display devices.

BEST MODE FOR CARRYING OUT THE INVENTION

The present invention will be further described with the following examples but are not limited thereto.

The experiments in the examples were conducted using liquid crystal display devices in which experiments the counterclockwise and clockwise directions viewed from the display-side transparent substrate to the other transparent substrate were defined as "+" and "−", respectively. However, conversely, even when the clockwise and counterclockwise directions viewed from the display-side transparent substrate to the other transparent substrate are defined as "+" and "−", respectively, the exactly same results were obtained.

In the examples, the wavelength dispersion of the birefringence of each material used in liquid crystal cells and optical compensation elements was determined by the following manner. First of all, horizontally and perpendicularly aligned samples were prepared from materials used for liquid crystal cells and optical compensation elements. The birefringence of each sample was measured using an Abbe refractometer in accordance with the Senarmont method. The resulting data were substituted in the Cauchy equation thereby obtaining the wavelength dispersion of the birefringence of the materials.

The retardation of each of the liquid crystal cell and the optical compensation element used in the examples was determined using the above-described equation (10). More specifically, the optical anisotropic element as described with reference to FIG. 1 was used for liquid crystal cells and optical compensation elements, and the incident- and output-side polarizers are arranged such that their absorption axes are to be in the relation expressed by equations (2) and (3). The transmission spectrum was observed to seek the wavelength λmin at which the transmissivity becomes minimum, and μmin and twist angle θ were substituted in equation (10) to determine the retardation at the wavelength μmin. Furthermore, the retardation at each wavelength was determined by considering the above-described wavelength dispersion of the birefringence.

EXAMPLE 1

Figure 3:
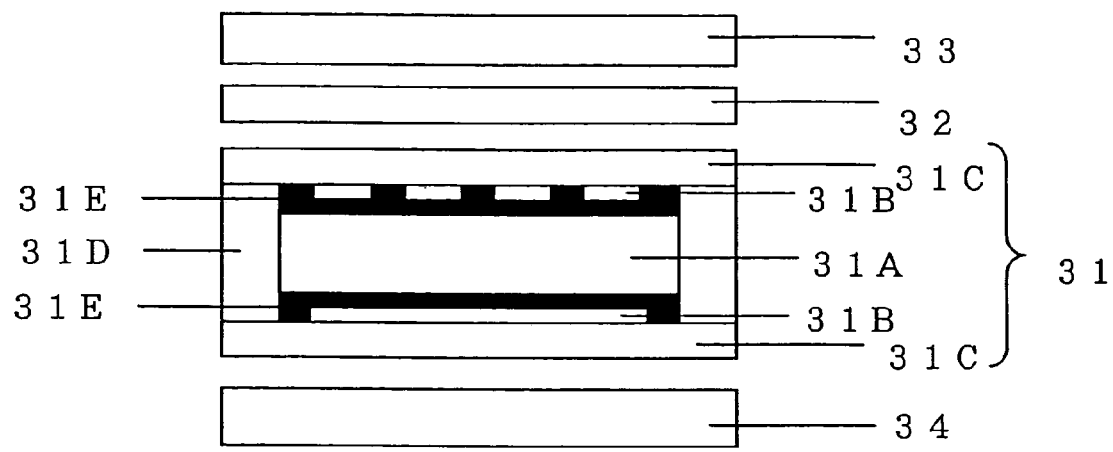
FIG. 3 is a schematic cross-sectional view showing the structure of the liquid crystal display device prepared in Examples 1 to 5 and Comparative Examples 1 to 4.

A transmission-type STN-LCD as schematically shown in FIG. 3 was prepared. As shown in FIG. 3, the liquid crystal cell 31 is constituted by a pair of transparent substrates 31C opposed to each other, spaced apart; electrodes 31B each formed on the inner surface of each of the substrates, and alignment films 31E each printed on each of the electrodes and having been subjected to an alignment treatment. A liquid crystalline substance was enclosed in the space defined by the alignment films 31E and a sealing agent 31D formed around the periphery of the substrates by print-coating thereby forming a liquid crystalline substance layer 31A. The liquid crystalline substance used was a ZLI-2293 manufactured by Merck Ltd. The liquid crystalline substance layer 31A was aligned in a predetermined direction by adjusting the alignment direction of the alignment films 31E thereby twisting the molecule orientation of the substance at an angle $\theta_1$=+250 degrees. The retardations $R_1(400)$ and $R_1(550)$ of the liquid crystal cell 31 at wavelengths λ=400 nm and λ=550 nm were 970 nm and 850 nm, respectively.

The polarizer 33 (SR1862AP manufactured by Sumitomo Chemical Co., Ltd.) was disposed on the display-side (upper side in the drawing) of the liquid crystal cell 31. Between the polarizer 33 and the liquid crystal cell 31 was disposed the optical compensation element 32 formed by a liquid crystal film of a liquid crystalline polyester wherein a twisted structure was formed. The optical compensation element 32 had a twist angle $\theta_2$=−180 degrees. The retardations $R_2(400)$ and $R_2(550)$ of the optical compensation element 32 at wavelengths λ=400 nm and λ=550 nm were 810 nm and 660 nm, respectively. The wavelength dispersion of the birefringence of the optical compensation element was controlled by varying the mixed ratio of the liquid crystal polyester with a large wavelength dispersion value to that with a small wavelength dispersion value.

As a result, D=0.84.

The polarizer 34 (SR1862AP manufactured by Sumitomo Chemical Co., Ltd.) was disposed on the rear side of the liquid crystal cell as viewed from the display side. The polarizer 33, the optical compensation element 32, the liquid crystal cell 31, and the polarizer 34 each were adhered to the adjacent components via a conventional transparent acrylic tacky adhesive layer.

Figure 4:
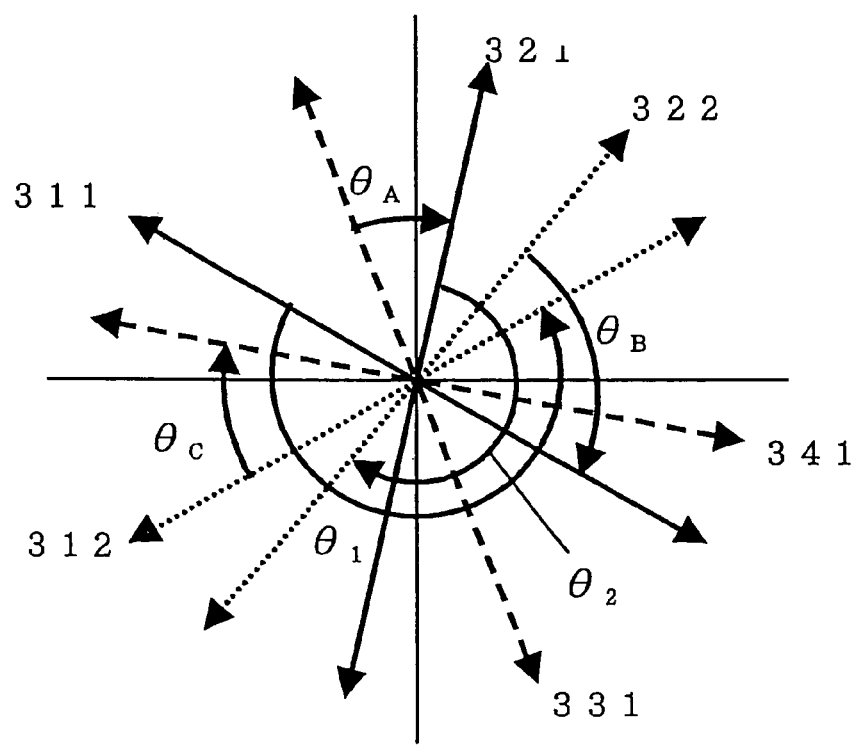
FIG. 4 is a plan view describing the axis angle relation of the display-side polarizer absorption axis, the liquid crystal cell orientation axis, the optical compensation element orientation axis, and the rear-side polarizer absorption axis (reflection axis only for Example 5).

FIG. 4 shows the relation among the angles $\theta_1$, $\theta_2$, $\theta_A$, $\theta_B$, and $\theta_C$ defined in each of the components of the STN-LCD. FIG. 4 shows the relation of the axis orientation of each of the components as viewed from the display-side.

In FIG. 4, the angle $\theta_A$ measured from the absorption axis 331 of the polarizer 33 to the orientation axis 321 on the top side of the optical compensation element 32 is −40 degrees; the angle $\theta_B$ measured from the orientation axis 322 on the bottom side of the optical compensation element 32 to the orientation axis 311 on the top side of the liquid crystal cell 31 is −85 degrees; and the angle $\theta_C$ measured from the orientation axis 312 on the bottom side of the liquid crystal cell 31 to the absorption axis 341 of the polarizer 34 is −45 degrees. With regard to the indication of the above angles, for example, $\theta_A$ can be indicated as "$\theta_A$=+140 degrees". However, as described above, the numerical value in the direction in which the absolute value of $\theta_A$ is 90 degrees or smaller was selected. $\theta_B$ and $\theta_C$ are indicated in the same manner. The same indications were used through the rest of the Examples and Comparative Examples.

Figure 5:
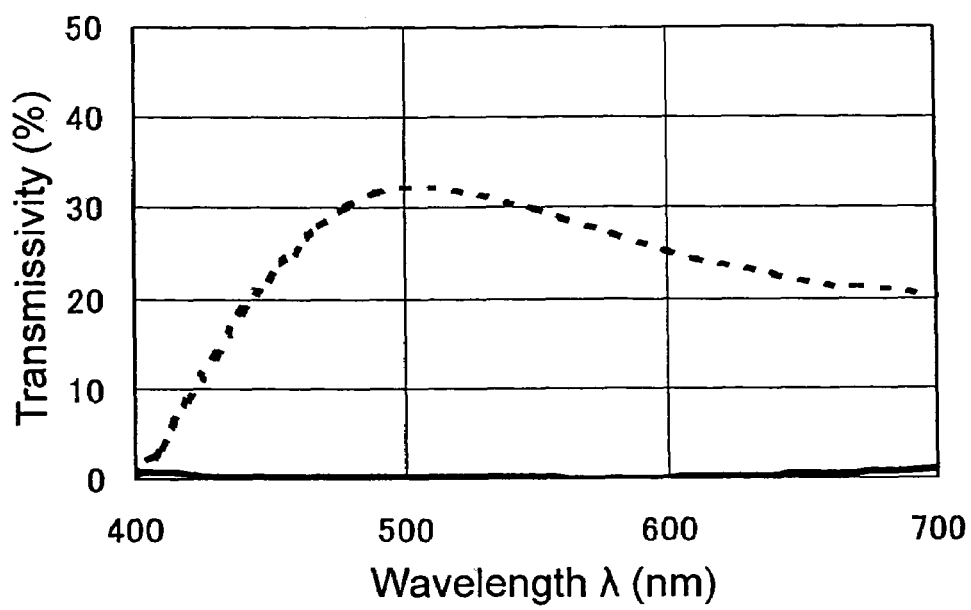
FIG. 5 shows the spectral transmission characteristics of the liquid crystal display of Example 1.

A driving voltage was applied from a driving circuit (not shown) to the electrodes 31B of the liquid crystal display device (1/160 duty, driven at the optimized bias). On examination of the optical characteristics of the device in the normally black mode using a light source, the spectral transmission characteristics shown in FIG. 5 were obtained. That is, an excellent black display equivalent to that of the D-STN mode used in Comparative Example 1 was obtained in the non-selective voltage application period, and a white display which was more neutral in hue and brighter than that of the D-STN mode was obtained in the selective voltage application period due to an enhancement in the long wavelength-side transmissivity thereby achieving a display of high a contrast ratio. Although in this example, the experiments were conducted using a liquid crystal display with no color filter, an excellent multi-color or full-color display can be achieved if a color filter is used. When the polarizer 34 was replaced by a polarizer with a transflective plate (SR1862AS-001 manufactured by Sumitomo Chemical Co., Ltd.), the display device provided not only an excellent transmission display when using a light source but also an excellent reflection display when using external light.

EXAMPLE 2

Example 1 was repeated except that the twist angle $\theta_1$ of the liquid crystal cell 31=+250 degrees; the retardations $R_1(400)$ and $R_1(550)$ of the liquid crystal cell 31 at wavelengths $\lambda$=400 nm and $\lambda$=550 nm were 910 nm and 800 nm, respectively; the twist angle $\theta_2$ of the optical compensation element 32 prepared from a liquid crystalline polyester in the same manner as Example 1=−180 degrees; the retardations $R_2(400)$ and $R_2(550)$ of the optical compensation element 32 at wavelengths $\lambda$=400 nm and $\lambda$=550 nm were 770 nm and 620 nm, respectively; and $\theta_A$=−40 degrees, $\theta_B$=+90 degrees, and $\theta_C$=−40 degrees, thereby preparing a liquid crystal display device similar to that in Example 1. As a result, D=0.78.

Figure 6:
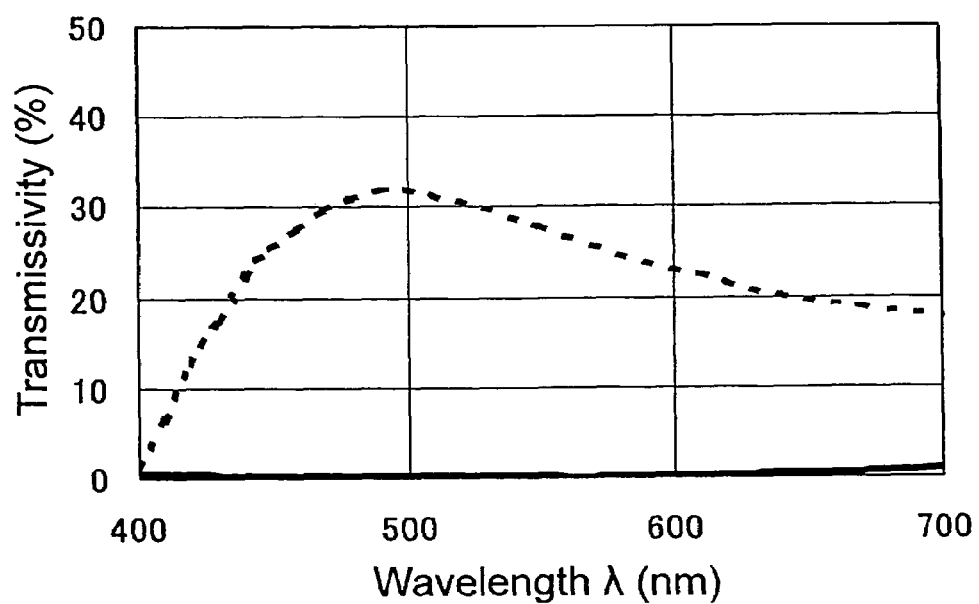
FIG. 6 shows the spectral transmission characteristics of the crystal display of Example 2.

A driving voltage was applied from a driving circuit (not shown) to the electrodes 31B of the liquid crystal display device thus prepared (1/160 duty, driven at the optimized bias). On examination of the optical characteristics of the device in the normally black mode using a light source, the spectral transmission characteristics shown in FIG. 6 were obtained. That is, similarly to Example 1, an excellent black display was obtained in the non-selective voltage application period, while a white display with bright and neutral hue was obtained in the selective voltage application period, thereby achieving a display of a high contrast ratio. Although in this example, the experiments were conducted using a liquid crystal display with no color filter, an excellent multi-color or full-color display can be achieved if a color filter is used. When the polarizer 34 is replaced by a polarizer with a transflective plate (SR1862AS-011 manufactured by Sumitomo Chemical Co., Ltd.), the display device provided not only an excellent transmission display when using a light source but also an excellent reflection display when using external light.

EXAMPLE 3

Example 1 was repeated except that the twist angle $\theta_1$ of the liquid crystal cell 31=+250 degrees; the retardations $R_1(400)$ and $R_1(550)$ of the liquid crystal cell 31 at wavelengths $\lambda$=400 nm and $\lambda$=550 nm were 1025 nm and 900 nm, respectively; the twist angle $\theta_2$ of the optical compensation element 32 prepared from a liquid crystalline polyester in the same manner as Example 1=−180 degrees; the retardations $R_2(400)$ and $R_2(550)$ of the optical compensation element 32 at wavelengths $\lambda$=400 nm and $\lambda$=550 nm were 830 nm and 700 nm, respectively; and $\theta_A$=−40 degrees, $\theta_B$=+90 degrees, and $\theta_C$=−40 degrees, thereby preparing a liquid crystal display device similar to that in Example 1. As a result, D=0.98.

Figure 7:
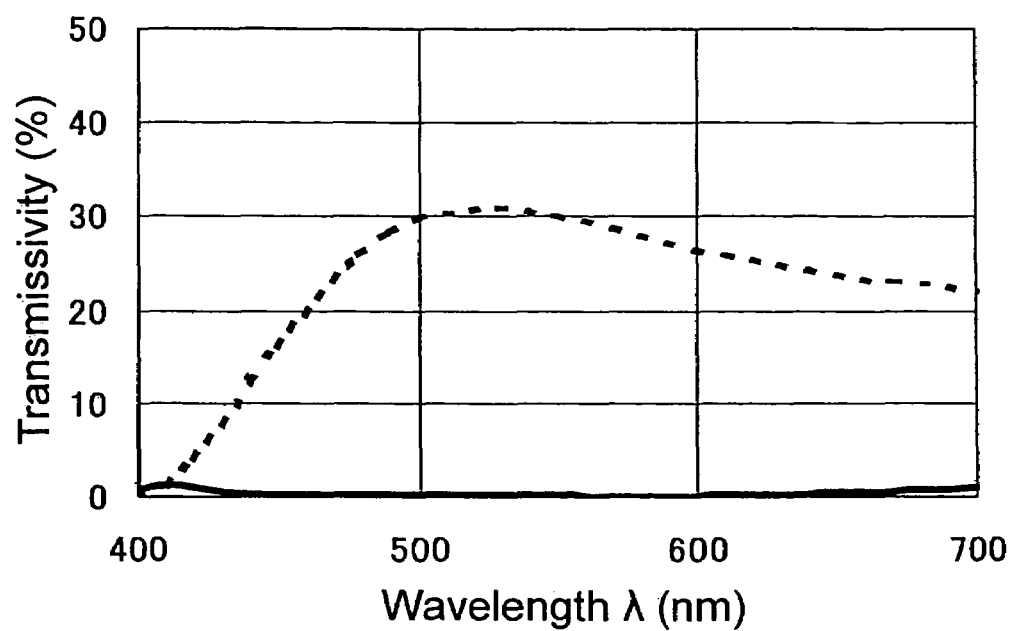
FIG. 7 shows the spectral transmission characteristics of the liquid crystal display of Example 3.

A driving voltage was applied from a driving circuit (not shown) to the electrodes 31B of the liquid crystal display device thus prepared (1/160 duty, driven at the optimized bias). On examination of the optical characteristics of the device in the normally black mode using a light source, the spectral transmission characteristics shown in FIG. 7 were obtained. That is, similarly to Example 1, an excellent black display was obtained in the non-selective voltage application period, while a white display with bright and neutral hue was obtained in the selective voltage application period, thereby achieving a display of a high contrast ratio. Although in this example, the experiments were conducted using a liquid crystal display with no color filter, an excellent multi-color or full-color display can be achieved if a color filter is used. When the polarizer 34 is replaced by a polarizer with a reflective plate (SR1862AU manufactured by Sumitomo Chemical Co., Ltd.), the display device provided an excellent reflection image when using external light.

COMPARATIVE EXAMPLE 1

Example 1 was repeated except that a compensation liquid crystal cell (no electrode formed thereon) containing a ZLI-2293 manufactured by Merck Ltd., similar to the liquid crystal cell 31 of Example 1 was prepared for compensating the liquid crystal cell in a D-STN compensation mode and substituted for the optical compensation element 32; the twist angle $\theta_2$ of the compensation liquid crystal cell =−250 degrees; the retardations $R_2(400)$ and $R_2(550)$ of the compensation liquid crystal cell at wavelengths $\lambda$=400 nm and $\lambda$=550 nm were 910 nm and 800 nm, respectively; and $\theta_A$=+45 degrees, $\theta_B$=+90 degrees, and $\theta_C$=−45 degrees, thereby preparing a liquid crystal display device similar to that in Example 1.

Figure 8:
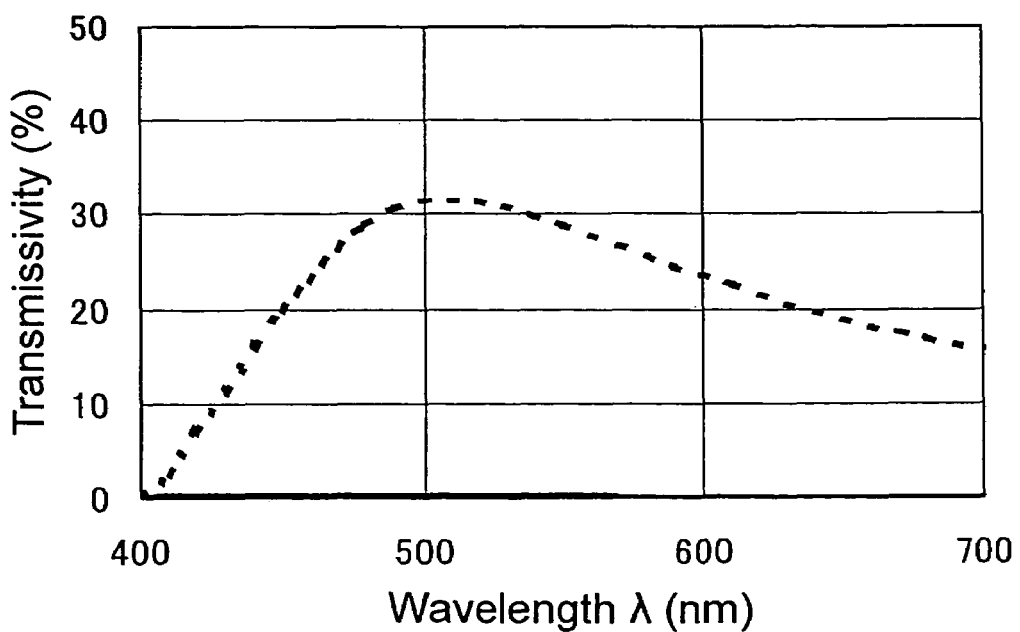
FIG. 8 shows the spectral transmission characteristics of the liquid crystal display of comparative Example 1.

A driving voltage was applied from a driving circuit (not shown) to the electrodes 31B of the liquid crystal display device thus prepared (1/160 duty, driven at the optimized bias). On examination of the optical characteristics of the device in the normally black mode using a light source, the spectral transmission characteristics shown in FIG. 8 were obtained. That is, an excellent black image was obtained in the non-selective voltage application period, thereby achieving a display of a high contrast ratio. However, in the selective voltage application period, it was confirmed that a white display was poorer in hue than that of Example 1.

COMPARATIVE EXAMPLE 2

Example 1 was repeated except that a compensation liquid crystal cell (no electrode formed thereon) containing a ZLI-2293 manufactured by Merck Ltd., similar to the liquid crystal cell 31 of Example 1 was prepared for compensating the liquid crystal cell and substituted for the optical compensation element 32; the twist angle $\theta_2$ of the compensation liquid crystal cell =−180 degrees; and the retardations $R_2(400)$ and $R_2(550)$ of the compensation liquid crystal cell at wavelengths $\lambda$=400 nm and $\lambda$=550 nm were 750 nm and 660 nm, respectively, thereby preparing a liquid crystal display device similar to that in Example 1. As a result, D=1.16.

Figure 9:
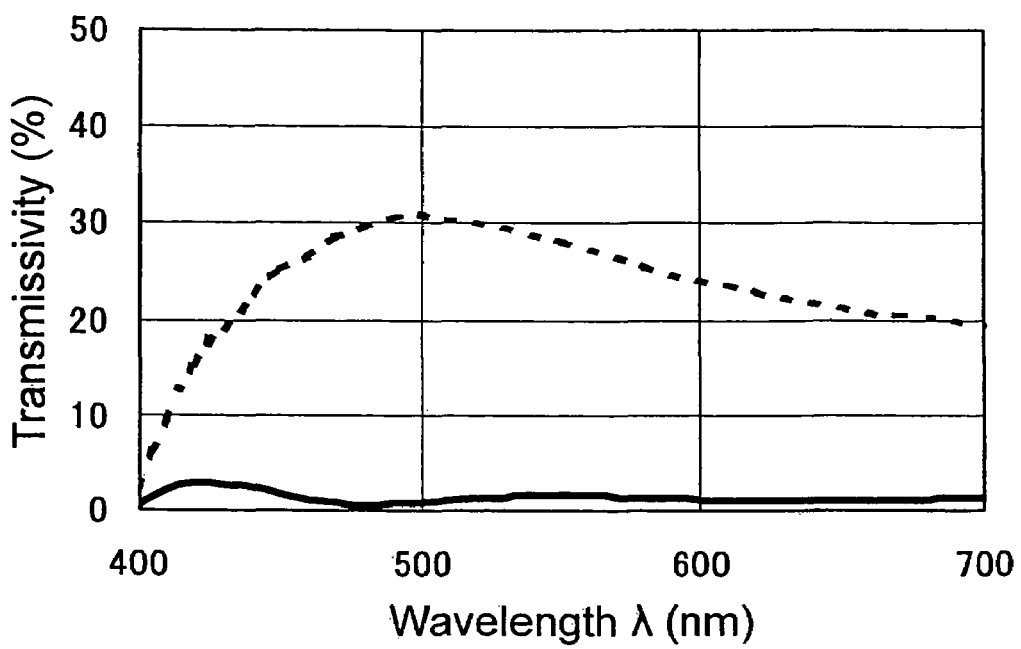
FIG. 9 shows the spectral transmission characteristics of the liquid crystal display of comparative Example 2.

A driving voltage was applied from a driving circuit (not shown) to the electrodes 31B of the liquid crystal display device thus prepared (1/160 duty, driven at the optimized bias). On examination of the optical characteristics of the device in the normally black mode using a light source, the spectral transmission characteristics shown in FIG. 9 were obtained. That is, in the non-selective voltage application period, the display was not sufficiently compensated, compared with that achieved by the liquid crystal display device of Example 1, resulting in a display of low contrast ratio.

EXAMPLE 4

Example 1 was repeated except that the twist angle $\theta_1$ of the liquid crystal cell 31=+240 degrees; the retardations $R_1(400)$ and $R_1(550)$ of the liquid crystal cell 31 at wavelengths $\lambda$=400 nm and $\lambda$=550 nm were 910 nm and 800 nm, respectively; the twist angle $\theta_2$ of the optical compensation element 32=−190 degrees; the retardations $R_2(400)$ and $R_2(550)$ of the optical compensation element 32 at wavelengths $\lambda$=400 nm and $\lambda$=550 nm were 780 nm and 630 nm, respectively; $\theta_A$=−40 degrees, $\theta_B$=+90 degrees, and $\theta_C$=+45 degrees; and the polarizer 34 was replaced by a polarizer (SR1862AU manufactured by Sumitomo Chemical Co., Ltd.) with a reflective plate thereby preparing a liquid crystal display device similar to that in Example 1. As a result, D=0.76.

Figure 10:
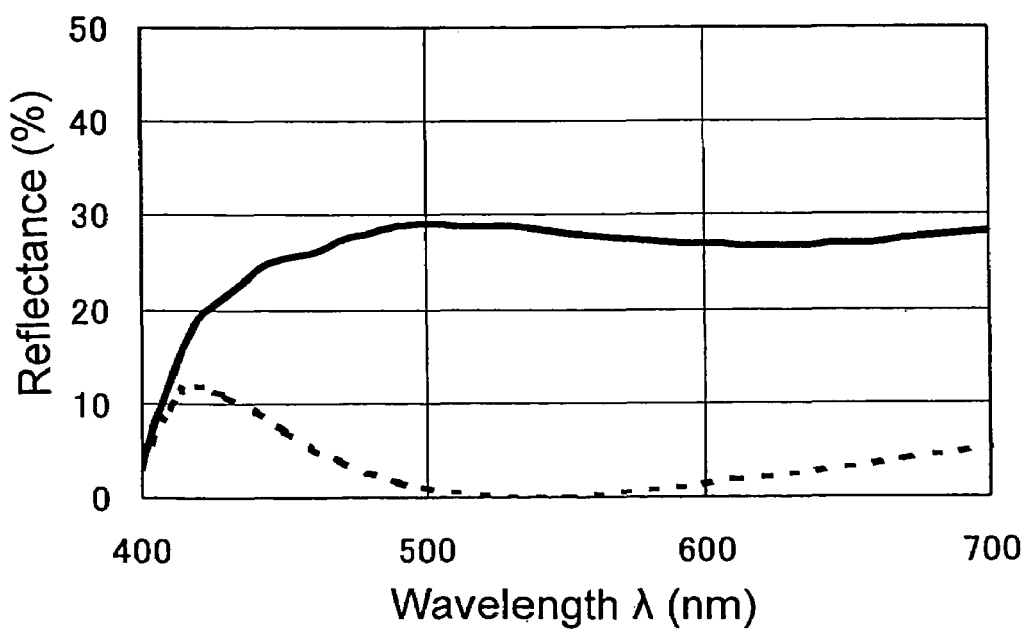
FIG. 10 shows the spectral reflection characteristics of the liquid crystal display of Example 4.

A driving voltage was applied from a driving circuit (not shown) to the electrodes 31B of the liquid crystal display device thus prepared (1/160 duty, driven at the optimized bias). On examination of the optical characteristics of the device in the normally white mode, the spectral reflection characteristics shown in FIG. 10 were obtained. That is, an excellent paper-white white display was obtained in the non-selective voltage application period while an excellent black display was obtained because the transmissivity was small at 550 nm at which the spectral luminous efficacy is high, in the selective voltage application period. Therefore, a reflection display of high contrast ratio was achieved. Although in this example, the experiments were conducted using a liquid crystal display with no color filter, an excellent multi-color or full-color display can be achieved if a color filter is used. When the polarizer 34 is replaced by a polarizer with a transflective plate (SR1862AS-011 manufactured by Sumitomo Chemical Co., Ltd.), the display device provided not only an excellent reflection display but also an excellent transmission display when using a light source.

EXAMPLE 5

Example 1 was repeated except that the twist angle $\theta_1$ of the liquid crystal cell 31=+250 degrees; the retardations $R_1(400)$ and $R_1(550)$ of the liquid crystal cell 31 at wavelengths $\lambda$=400 nm and $\lambda$=550 nm were 970 nm and 850 nm, respectively; the twist angle $\theta_2$ of the optical compensation element 32=−190 degrees; the retardations $R_2(400)$ and $R_2(550)$ of the optical compensation element 32 at wavelengths $\lambda$=400 nm and $\lambda$=550 nm were 800 nm and 670 nm, respectively; $\theta_A$=−45 degrees, $\theta_B$=+90 degrees, and $\theta_C$=−45 degrees; and the polarizer 34 was replaced by a reflection-type polarizer (RDF-C manufactured by Sumitomo 3M Co., Ltd.), thereby preparing a liquid crystal display device similar to that in Example 1. As a result, D=0.94.

Figure 11:
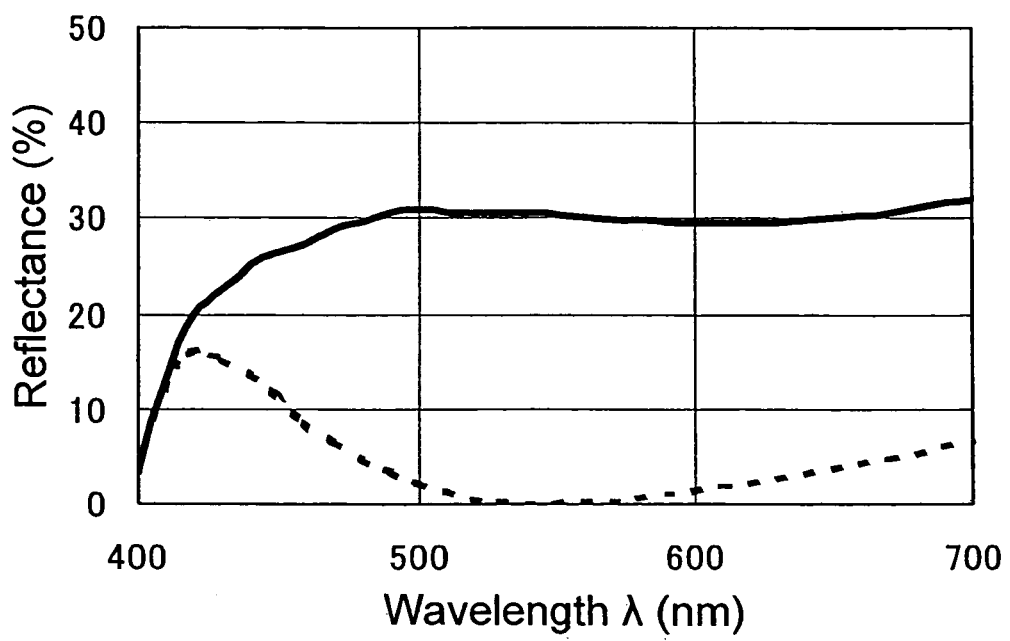
FIG. 11 shows the spectral reflection characteristics of the liquid crystal display of Example 5.

A driving voltage was applied from a driving circuit (not shown) to the electrodes 31B of the liquid crystal display device thus prepared (1/160 duty, driven at the optimized bias). On examination of the optical characteristics of the device in the normally white mode, the spectral reflection characteristics shown in FIG. 11 were obtained. That is, an excellent paper-white white display was obtained in the non-selective voltage application period while an excellent black display was obtained in the selective voltage application period. Therefore, a reflection display of a high contrast ratio was achieved. Although in this example, the experiments were conducted using a liquid crystal display with no color filter, an excellent multi-color or full-color display can be achieved if a color filter is used.

COMPARATIVE EXAMPLE 3

Example 4 was repeated except that a compensation liquid crystal cell (no electrode formed thereon) containing a ZLI-2293 manufactured by Merck Ltd., similar to the liquid crystal cell 31 was prepared for compensating the liquid crystal cell in a D-STN compensation mode and substituted for the optical compensation element 32; the twist angle $\theta_2$ of the compensation liquid crystal cell =−240 degrees; the retardations $R_2(400)$ and $R_2(550)$ of the compensation liquid crystal cell at wavelengths $\lambda$=400 nm and $\lambda$=550 nm were 855 nm and 750 nm, respectively; and $\theta_A$=+45 degrees, $\theta_B$=+90 degrees, and $\theta_C$=+45 degrees thereby preparing a liquid crystal display device similar to that in Example 4.

Figure 12:
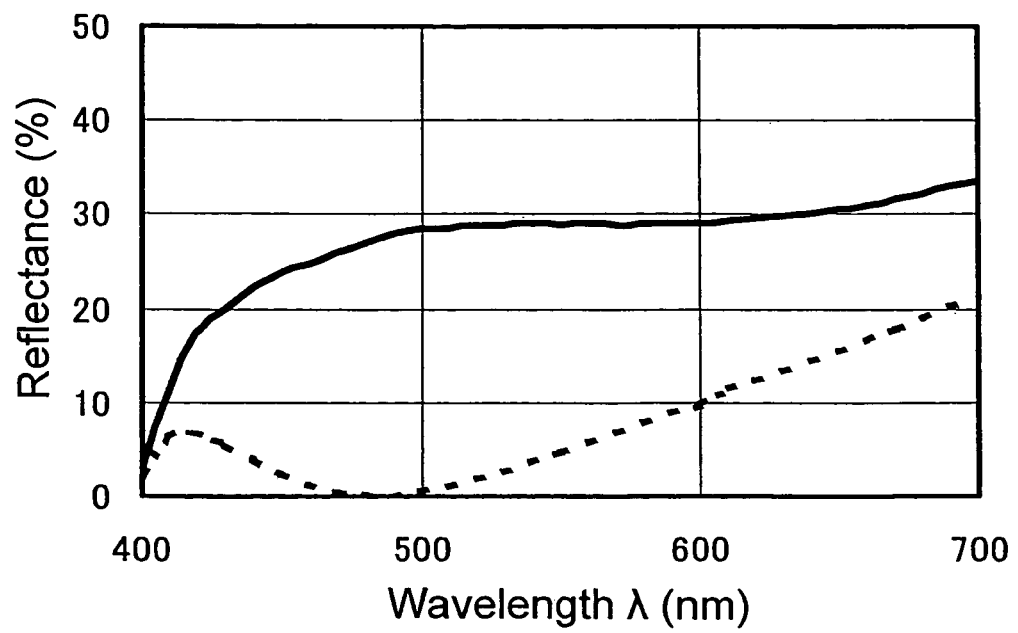
FIG. 12 shows the spectral reflection characteristics of the liquid crystal display of Comparative Example 3.

A driving voltage was applied from a driving circuit (not shown) to the electrodes 31B of the liquid crystal display device thus prepared (1/160 duty, driven at the optimized bias). On examination of the optical characteristics of the device in the normally white mode using a light source, the spectral reflection characteristics shown in FIG. 12 were obtained. That is, upon black display, i.e., in the selective voltage application period, light leakage occurred at 550 nm at which a spectral luminous efficacy is high, resulting in a reflective display of a low contrast ratio.

COMPARATIVE EXAMPLE 4

Example 4 was repeated except that the twist angle $\theta_1$ of the liquid crystal cell 31=+240 degrees; the retardations $R_1(400)$ and $R_1(550)$ of the liquid crystal cell 31 at wavelengths $\lambda$=400 nm and $\lambda$=550 nm were 910 nm and 800 nm, respectively; the twist angle $\theta_2$ of the optical compensation element 32=−190 degrees; and the retardations $R_2(400)$ and $R_2(550)$ of the optical compensation element at wavelengths $\lambda$=400 nm and $\lambda$=550 nm were 850 nm and 630 nm, respectively, thereby preparing a liquid crystal display device similar to that in Example 4. As a result, D=0.35.

Figure 13:
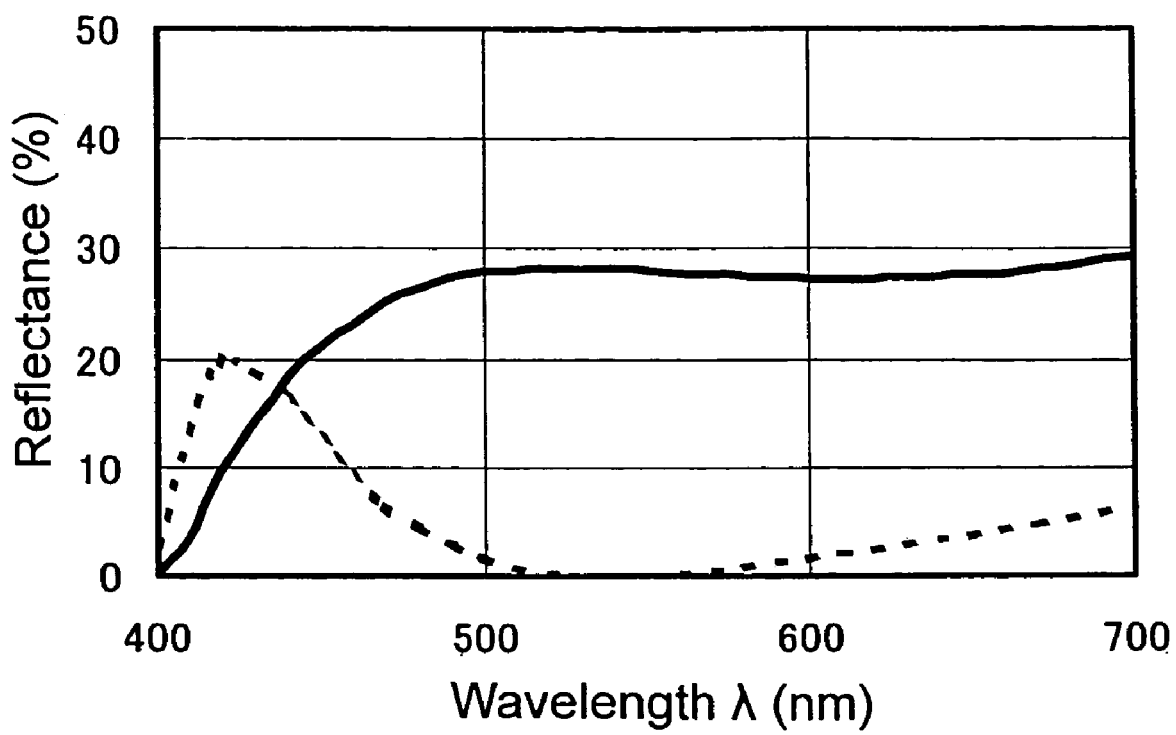
FIG. 13 shows the spectral reflection characteristics of the liquid crystal display of Comparative Example 4.

A driving voltage was applied from a driving circuit (not shown) to the electrodes 31B of the liquid crystal display device thus prepared (1/160 duty, driven at the optimized bias). On examination of the optical characteristics of the device in the normally white mode using a light source, the spectral reflection characteristics shown in FIG. 13 were obtained. That is, upon black display, i.e., in the selective voltage application period, the large leakage of light on a short wavelength side occurred, resulting in a poor display, comparing with that achieved by the liquid crystal display device of Example 4.

What is claimed is:

1. A liquid crystal display device comprising: a liquid crystal cell formed by a pair of transparent substrates each provided with an electrode and a liquid crystalline substance layer sandwiched between said transparent substrates; a pair of polarizers disposed on opposite sides of said liquid crystal cell; and an optical compensation element disposed on at least one side of said liquid crystal cell between said liquid crystal cell and one of said polarizers, a driving voltage being applied on the liquid crystalline substance layer by selecting the voltage from two or more voltages; wherein the twist angle of said liquid crystal cell is set to 180 to 270 degrees; wherein said optical compensation element has a twisted structure twisted in the opposite direction to that of said liquid crystal cell; wherein the difference in the absolute values of the twist angles between said liquid crystal cell and said optical compensation element is from 40 to 100 degrees; wherein the difference in retardation at a wavelength $\lambda$=550 nm between said liquid crystal cell and said optical compensation element is from 100 to 250 nm; and wherein when the absolute values of the differences in retardation at wavelengths $\lambda$ of 400 nm and 550 nm between said liquid crystal cell and said optical compensation element are represented by $\Delta R(400)$ and $\Delta R(550)$, respectively, and the ratio D therebetween is represented by D=$\Delta R(400)$/$\Delta R(550)$, D is within the range of 0.5 to 1.0.

2. The liquid crystal display device according to claim 1; wherein said optical compensation element is a liquid crystal film.

* * * * *